(12) United States Patent
Shield et al.

(10) Patent No.: US 10,144,488 B2
(45) Date of Patent: Dec. 4, 2018

(54) PRELOADED MOORING CONNECTOR

(71) Applicant: Subsea Riser Products Limited, Woking (GB)

(72) Inventors: John Shield, London (GB); Michael Burt, Surrey (GB)

(73) Assignee: SUBSEA RISER PRODUCTS LIMITED, Woking (GB)

( * ) Notice: Subject to any disclaimer, the term of this patent is extended or adjusted under 35 U.S.C. 154(b) by 687 days.

(21) Appl. No.: 14/367,606

(22) PCT Filed: Dec. 19, 2012

(86) PCT No.: PCT/GB2012/053183
§ 371 (c)(1),
(2) Date: Jun. 20, 2014

(87) PCT Pub. No.: WO2013/093455
PCT Pub. Date: Jun. 27, 2013

(65) Prior Publication Data
US 2014/0363225 A1    Dec. 11, 2014

(30) Foreign Application Priority Data
Dec. 22, 2011 (GB) .................................. 1122204.9

(51) Int. Cl.
*B63B 21/00* (2006.01)
*B63B 21/50* (2006.01)
(Continued)

(52) U.S. Cl.
CPC .............. *B63B 21/04* (2013.01); *B63B 21/20* (2013.01); *B63B 2021/007* (2013.01);
(Continued)

(58) Field of Classification Search
None
See application file for complete search history.

(56) References Cited

U.S. PATENT DOCUMENTS 3,430,305 A   3/1969  Geffner
3,905,190 A * 9/1975  Pearlman ................ B63B 21/20
                                                       114/249

(Continued)

FOREIGN PATENT DOCUMENTS

EP    0298683 A2   1/1989
EP    0328196 A1   8/1989
GB    2085990 A    5/1982

*Primary Examiner* — Joshua J Michener
*Assistant Examiner* — Kyle J. Walraed-Sullivan
(74) *Attorney, Agent, or Firm* — Hayes Soloway PC

(57) ABSTRACT

The present invention relates to a subsea structural connector (20) used in the offshore oil and gas industry for remotely joining elements of production and drilling vessel mooring systems and other subsea equipment. This invention relates to a connection mechanism that facilitates automatic latching of two components (1, 2) upon engagement, and then remotely controlled actuation of a device that secures the connection. Specifically, this invention relates to a securing mechanism that creates residual stress between the connected components (1, 2) such that the connector (20) can withstand high variable axial, shear, torsional and bending loads while minimizing the propensity for fatigue damage within the mechanism.

14 Claims, 9 Drawing Sheets

(51) Int. Cl.
  *B63B 21/04*    (2006.01)
  *B63B 21/20*    (2006.01)
(52) U.S. Cl.
  CPC ..... *B63B 2021/203* (2013.01); *F16B 2200/10* (2018.08); *Y10T 29/49826* (2015.01); *Y10T 403/70* (2015.01)

(56) References Cited

U.S. PATENT DOCUMENTS

| | | | | |
|---|---|---|---|---|
| 4,459,933 | A * | 7/1984 | Burchett | B63B 21/502 114/230.26 |
| 4,498,814 | A * | 2/1985 | Brake | B63B 21/502 405/169 |
| 4,611,953 | A * | 9/1986 | Owens | B63B 21/502 114/294 |
| 4,647,254 | A * | 3/1987 | Baugh | E21B 33/038 166/345 |
| 4,648,629 | A * | 3/1987 | Baugh | E21B 33/038 285/26 |
| 4,797,036 | A * | 1/1989 | Collins | B63B 21/502 114/294 |
| 4,828,035 | A * | 5/1989 | McInturff | E21B 41/10 166/339 |
| 4,869,615 | A * | 9/1989 | Galle | B63B 21/502 285/321 |
| 5,020,942 | A * | 6/1991 | Pallini, Jr. | B63B 21/502 403/369 |
| 5,259,459 | A * | 11/1993 | Valka | E21B 33/038 166/217 |
| 6,196,757 | B1 * | 3/2001 | Bakke | E21B 41/10 403/322.3 |
| 6,293,343 | B1 * | 9/2001 | Pallini, Jr. | E21B 33/038 166/345 |
| 7,216,699 | B2 * | 5/2007 | Nelson | E21B 23/02 166/338 |
| 7,503,391 | B2 * | 3/2009 | McCanna | E21B 33/038 166/343 |
| 8,020,623 | B2 * | 9/2011 | Parks | E21B 33/0355 166/339 |
| 8,720,574 | B2 * | 5/2014 | Cuiper | E21B 33/038 166/338 |
| 9,441,707 | B2 * | 9/2016 | Pearlman | F16G 11/00 |
| 9,482,061 | B2 * | 11/2016 | Latimer | E21B 17/017 |
| 2006/0269360 | A1 * | 11/2006 | Rowley | F16B 7/025 405/158 |
| 2008/0156245 | A1 * | 7/2008 | Duarte | B63B 21/54 114/230.15 |
| 2011/0121560 | A1 * | 5/2011 | Readman | F16B 12/24 285/82 |
| 2011/0162747 | A1 * | 7/2011 | Routeau | E21B 17/017 138/106 |
| 2012/0031320 | A1 * | 2/2012 | Bauduin | B63B 21/502 114/264 |
| 2012/0096700 | A1 * | 4/2012 | Patterson | F16L 25/06 29/428 |
| 2014/0363225 | A1 * | 12/2014 | Shield | B63B 21/04 403/361 |
| 2015/0020725 | A1 * | 1/2015 | Taylor | B63B 21/04 114/230.1 |
| 2015/0251731 | A1 * | 9/2015 | Taylor | B63B 21/20 114/230.26 |
| 2016/0052604 | A1 * | 2/2016 | Taylor | B63B 21/50 114/230.26 |
| 2016/0052752 | A1 * | 2/2016 | Walmsley | F16L 1/20 403/373 |

* cited by examiner

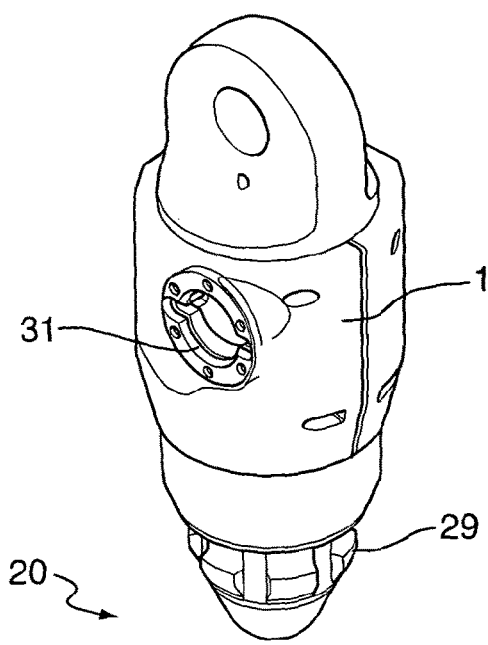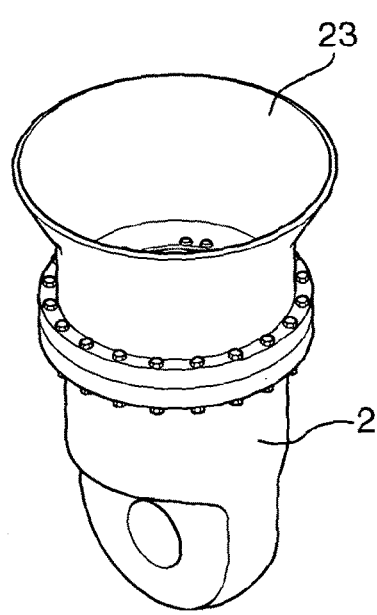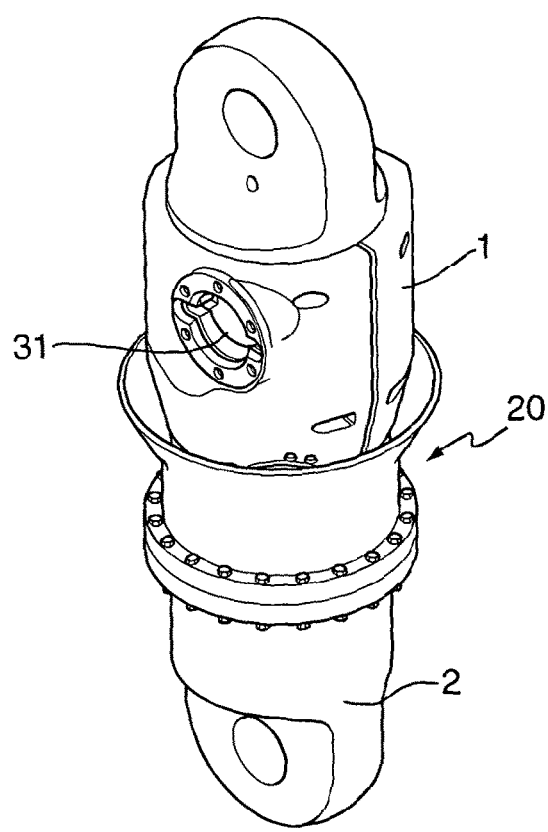
FIG. 6a
FIG. 6b

SECTION A-A

SECTION B-B

SECTION C-C

SECTION D-D

SECTION E-E

PRELOADED MOORING CONNECTOR

FIELD OF THE INVENTION

The present invention relates to a subsea preloaded connector, an assembly comprising a subsea preloaded connector and a method of connecting a first subsea element to a second subsea element. In particular, the present invention relates to a subsea structural connector used in the offshore oil and gas industry for remotely joining elements of production and drilling vessel mooring systems and other subsea equipment.

BACKGROUND TO THE INVENTION

Floating offshore drilling production facilities are typically moored to the seabed via multiple catenary mooring lines, taut leg mooring lines or vertical tethers to maintain the facility in the required position with respect to the seabed. Such mooring lines are typically paid out from the vessel and connected to the seabed pile or anchor; this connection is achieved remotely owing to the water depths operated in modern oilfields.

Due to the environmental and operational loading conditions, the mooring tether must be reliably connected to the structure and simultaneously accommodate fluctuating axial, torsional and angular motions occurring between the mooring line and vessel structure. These motions occur in response to loading from ocean currents, waves and wind. Similar duty may be required in a structural connector used for anchoring seabed structures or risers.

The combination of remote operation, high tension and angular motions leads to a challenging design scenario to prevent the components from being difficult to operate, overstressed or fatigued.

It is an aim of the present invention to overcome at least one of the problems associated with the prior art whether referred to herein or otherwise.

SUMMARY OF THE INVENTION

According to a first aspect of the present invention there is provided a subsea preloaded connector comprising a male component and a female component, the connector comprising engagement means to engage the male component with the female component and securement means to secure the male component to the female component, wherein the engagement means comprises an engagement means on one component which is arranged to move radially into an engagement with an engagement surface on the other component to initially engage the male component to the female component, and wherein the connector comprises actuating means to actuate the securement means once the components are engaged, the securement means comprising a securement means on one component which moves radially into securement with a securement surface on the other component and wherein the securement means and the securement surface comprise cooperating securement surfaces which cause the connector to be preloaded on securement of the male and female components.

The engagement means may comprise an engagement member.

The securement means may comprise a securement member.

The engagement member and the securement member may comprise a single connector member which provides both the securement means and the engagement means.

The connector member may comprise an engagement surface and a securement surface and wherein the surfaces may at least partially overlap.

Preferably the connector member is provides on the male component.

The connector may comprise a plurality of connector members. The connector member may be radially spaced around the male component.

The engagement means may be provided on an engagement member. Preferably the engagement member is provided on the male component.

Preferably the engagement means comprises a plurality of engagement members.

The or each engagement member may comprise an engagement lug.

Preferably the engagement means comprise a series of engagement lugs which are spaced radially around an outer circumference of the male component.

The or each engagement member may be radially movable between an outer engaged position and an inner disengaged position.

Preferably the engagement means comprises urging means to urge the or each engagement member towards an outer radial position. The urging means may comprise resilient means. The urging means may comprise a spring.

The engagement means may comprise a disengagement actuator in order to disengage the or each engagement member from the or each engagement recess. The disengagement actuator may comprise a disengagement actuator ring. The disengagement actuator may be controlled by activation means.

The securement means may be provided on a securement member. Preferably the securement member is provided on the male component.

The securement member and the engagement member may be integrated in a single connector member.

The securement member and the engagement member may be combined and provided on a single connector member.

Preferably the securement means comprises a plurality of securement members.

The or each securement member may comprise a securement lug.

Preferably the securement means comprise a series of securement lugs which are spaced radially around an outer circumference of the male component.

The or each securement member may be radially movable between an outer secured position and an inner unsecured position.

The or each securement member may comprise a pivoting member. Accordingly, as a first end of a securement member moves radially outwardly a second end of the securement member moves radially inwardly. The first end of the securement member may comprise a securement lug to secure within a securement recess.

The securement lug may include a shaped surface to cooperate with a shaped surface of the securement recess. The shaped surface of the securement lug may comprise a tapered or sloped surface to cooperate with a tapered or sloped surface provided by the securement recess. The cooperating surface are arranged to cause the male component to move axially relatively away from the female component in order to preload the connector.

The securement means may comprise a securement actuator in order to secure the or each securement member into the or each securement recess. The securement actuator may comprise a securement actuator ring. The securement actuator may be controlled by activation means.

Preferably the securement actuator is movable within the male component between a first position and a second position. Preferably the securement actuator is axially movable within the male component and may move co-axially along a central longitudinal axis of the male component.

The activation means may comprise a shaft located within the male component. Preferably the shaft comprises a threaded shaft which engages with the engagement actuator and/or the securement actuator. Preferably rotation of the shaft causes (translational) movement of the engagement actuator and/or the securement actuator.

The activation means may comprise an ROV torque actuator. The activation means may comprise direct or attached pistons to move a drive cylinder.

The activation means may comprise a coupler in order for the activation means to be activated by a separate control means. The control means may comprise a Remote Operated Vehicle (ROV).

The couple may cooperate with a bevel gear in order to rotate the shaft. Accordingly, the coupler may be located on a radial circumferential surface of the male component.

The or each engagement member may be located towards a distal end of the male component relative to the or each securement member which may be located towards a proximal end of the male component.

The engagement surface may be provided on the female component. The engagement surface may comprise an engagement shoulder and preferably comprise a circular shoulder. Preferably the engagement surface comprises an inwardly projecting surface provided around the entire inner circumference of the female component.

The securement surface may be provided on the female component. The securement surface may comprise a securement shoulder and preferably comprise a circular shoulder. Preferably the securement surface comprises an inwardly projecting surface provided around the entire inner circumference of the female component. The securement surface may be provided by a recess and more preferably by a groove. The groove may comprise an annular groove located on an inner surface of the female component.

Preferably the male component comprises attachment means in order to attach a mooring element to the male component.

Preferably the female component comprises attachment means in order to attach a mooring element to the female component.

The female component may comprise guide means to guide the male component into engagement with the female component. The guide means may comprise an outwardly flared entry section.

The female component may comprise a cylindrical section which may have an inner surface providing the engagement surface and/or the securement surface.

The engagement surface may be located towards a proximal end of the female component relative to the securement surface which may be located towards a distal end of the female component.

Preferably the engagement means comprises a plurality of connector members.

The or each connector member may comprise a lug which may function as both an engagement lug and a securement lug. The or each connector member may comprise an engagement lug.

Preferably the connector members provide a series of engagement lugs which are spaced radially around an outer circumference of the male component.

Preferably the connector members provide a series of securement lugs which are spaced radially around an outer circumference of the male component.

The or each connector member may be radially movable between an outer engaged position and an inner disengaged position.

Preferably the engagement means comprises urging means to urge the or each connector member towards an outer radial position. The urging means may comprise resilient means. The urging means may comprise a spring.

The engagement means may comprise a disengagement actuator in order to disengage the or each connector member from the or each engagement recess. The disengagement actuator may comprise a disengagement actuator ring. The disengagement actuator may be controlled by activation means.

Preferably the securement means comprises a plurality of connector members.

The or each connector member may comprise a securement lug.

Preferably the connector members provide a series of securement lugs which are spaced radially around an outer circumference of the male component.

The or each connector member may be radially movable between an outer secured position and an inner unsecured position. The or each connector member may be operable between a secured configuration and an unsecured configuration. Preferably in the secured configuration the or each connector member is fixed in a static configuration and preferably in an outer position. Preferably in the unsecured configuration the or each connector member is either movable towards an inner position or is retained in an inner position.

The or each connector member may comprise a pivoting member. Accordingly, as a first end of a connector member moves radially outwardly a second end of the connector member moves radially inwardly. The first end of the connector member may comprise a lug which may operate as both an engagement lug and a securement lug to engage and secure within a securement recess.

The lug may include a shaped surface to cooperate with a shaped surface of the securement recess. The shaped surface of the lug may comprise a tapered or sloped surface to cooperate with a tapered or sloped surface provided by the securement recess. The cooperating surface are arranged to cause the male component to move axially relatively away from the female component in order to preload the connector.

The securement means may comprise a securement actuator in order to secure the or each connector member into the or each securement recess. The securement actuator may comprise a securement actuator ring. The securement actuator may be controlled by activation means.

Preferably the securement actuator is movable within the male component between a first position and a second position. Preferably the securement actuator is axially movable within the male component and may move co-axially along a central longitudinal axis of the male component.

The activation means may comprise a shaft located within the male component. Preferably the shaft comprises a threaded shaft which engages with the engagement actuator and/or the securement actuator. Preferably rotation of the shaft causes (translational) movement of the engagement actuator and/or the securement actuator.

Preferably the subsea preloaded connector secures a first mooring element to a second mooring element. Preferably the or each mooring element comprises a flexible mooring cable.

According to a second aspect of the present invention there is provided a subsea assembly comprising a first subsea element, a second subsea element and a preloaded connector comprising a male component and a female component, the connector comprising engagement means to engage the male component with the female component and securement means to secure the male component to the female component, wherein the engagement means comprises an engagement member on one component which is arranged to move radially into an engagement with an engagement surface on the other component to initially engage the male component to the female component, and wherein the connector comprises actuating means to actuate the securement means once the components are engaged, the securement means comprising a securement member on one component which moves radially into securement with a securement surface on the other component and wherein the securement member and the securement surface comprise cooperating securement surfaces which cause the connector to be preloaded on securement of the male and female components.

According to a third aspect of the present invention there is provide a method of connecting a first subsea element to a second subsea element comprising inserting at least a part of a male component into a female component and urging an engagement member on one component radially in order for the engagement member to engage with an engagement surface on the other component to engage the male component to the female component, subsequently radially moving a securement member on one component into securement with a securement surface on the other component and wherein the securement member and the securement surface comprise cooperating securement surfaces which cause the connector to be preloaded on securement of the male and female components.

Preferably the method comprises operating activation means in order to radially move the securement member into securement with the securement surface.

The method may comprise controlling a Remote Operated Vehicle (ROV) in order to secure the male component to the female component. The method may comprise controlling a ROV in order to disengage and/or unsecure the male component from the female component

BRIEF DESCRIPTION OF THE DRAWINGS

The invention will now be further described, by way of example only, and with reference to the accompanying drawings, in which:

FIG. 6a is a perspective view of another preferred embodiment of a connector in a disengaged and unsecured configuration.

FIG. 6b is a perspective view of another preferred embodiment of a connector in an engaged and secured configuration.

DESCRIPTION OF THE PREFERRED EMBODIMENTS

Figure 1A:
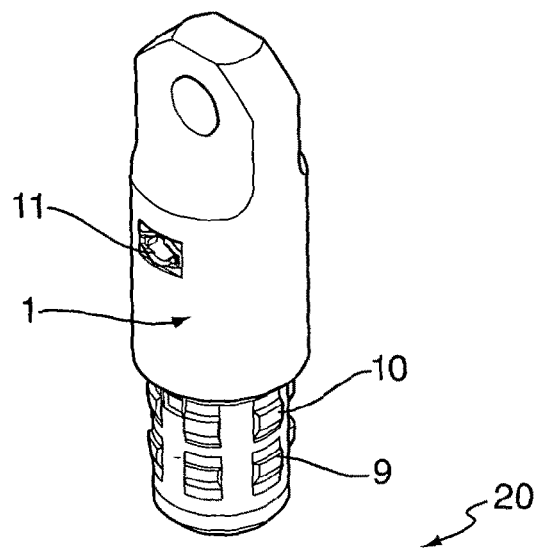
FIG. 1a is a perspective view of a preferred embodiment of a connector in a disengaged and unsecured configuration.

The present invention relates to a subsea structural connector 20 used in the offshore oil and gas industry for remotely joining elements of production and drilling vessel mooring systems and other subsea equipment.

Specifically, the present invention relates to a connection mechanism that facilitates automatic latching of two components upon engagement, and the remotely controlled actuation of a device that secures the connection. Specifically, this invention relates to a securing mechanism that creates residual stress between the connected components 1, 2 such that the connector 20 can withstand high variable axial, shear, torsional and bending loads while minimising the propensity for fatigue damage within the mechanism.

The connector 20 comprises an actuated male component 1, which is inserted into a static female receptacle 2. The male component 1 contains a number of radially projecting spring loaded catches 9 to provide an automatic latching mechanism, an actuator ring to release the spring loaded catches, a set of radially projecting segments 10, an actuator ring within the segments to move them to the released or engaged position, and a torque or pressure responsive method for moving the two actuator rings.

The connector 20 comprises an actuated male component 1, which is inserted into a static female receptacle 2. The receptacle comprises 2 a substantially cylindrical opening with an internal diameter which is dimensioned to the external diameter of the male component 1 so that when the male component 1 is inserted, the two components 1, 2 are sufficiently aligned to enable a static profile on the external diameter of the male component 1 to land on a matching profile on the internal diameter of the female component (receptacle) 2.

The male component 1 includes engagement members in the form of radially projecting spring loaded catches 9 which are positioned axially on the male component 1. When the male component 1 lands on a shoulder within the female receptacle 2, the catches 9 are permitted to extend within corresponding engagement (securement) areas which comprise a machined profile in the receptacle 2. In particular, the female component 2 includes a circumferential shoulder or engagement surface 6 which is arranged to cooperate with the ends and particularly a face (or engagement surface) of the catches 9. The axial position of the catches 9 and the profile, relative to the aforementioned shoulder, prevents relative axial movement of the male and female components 1, 2 to the tolerance of the mechanism. The downward facing edges of the catches 9 are tapered and the radial spring force is selected such that the inertia of the male or female component 1, 2 is sufficient to retract the catches 9 past the aforementioned shoulder profile within the receptacle 2. As described, this mechanism provides an automatic latching capability or an initial engagement capability.

Once latched, an actuator or activator 11 is remotely operated on the body of the male component 1. This forces an actuator member in the form of a segment actuator ring to move in one direction. The movement of the segment actuator ring moves each of the segments 10 outwards into a securing recess such that securement surfaces on the segments 10 or on a lug of the male component 1 abut and secure against a second securement (engaging) surface within the securing recess of the female receptacle 2, thereby securing the male and female components 1, 2 together. The securement (engaging) surfaces of the segments 10 and male and female components 1, 2 are tapered, such that by forcing the segments 10 outwards, a tensile force is induced in the segments 10 and a balancing compressive force exists between the male component 1 and female receptacle shoulders. The tensile force, or preload, enables the relatively slender segments 10 to achieve an enhanced fatigue life, compared to an unloaded component of the same size.

Figure 1B:
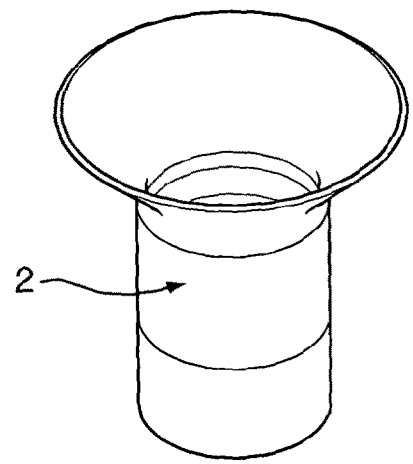
FIG. 1b is a perspective view of a preferred embodiment of a connector in an engaged and secured configuration.
Figure 1B:
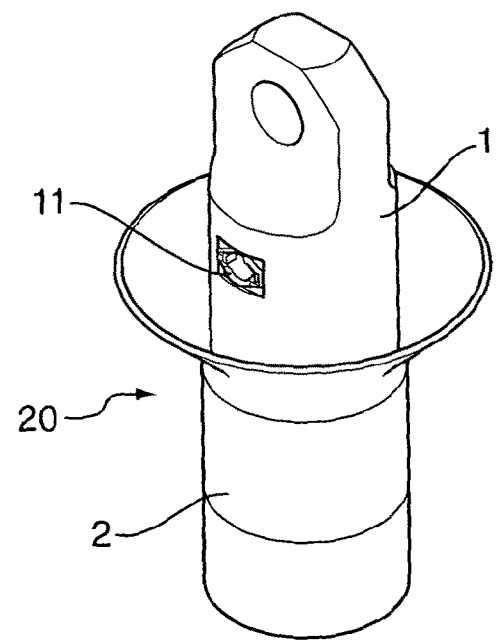

FIG. 1a is shows an isometric view of the male component 1 whilst unsecured and disengaged from the female component 2. The male component 1 comprises a forged cylindrical body which retains the latching device, the preloaded segments, the actuating mechanism (not shown), a remote actuation interface 11 and a typical interface to mooring equipment. FIG. 1b shows the male component 1 in a secured and engaged configuration within the female component 2.

Figure 2A:
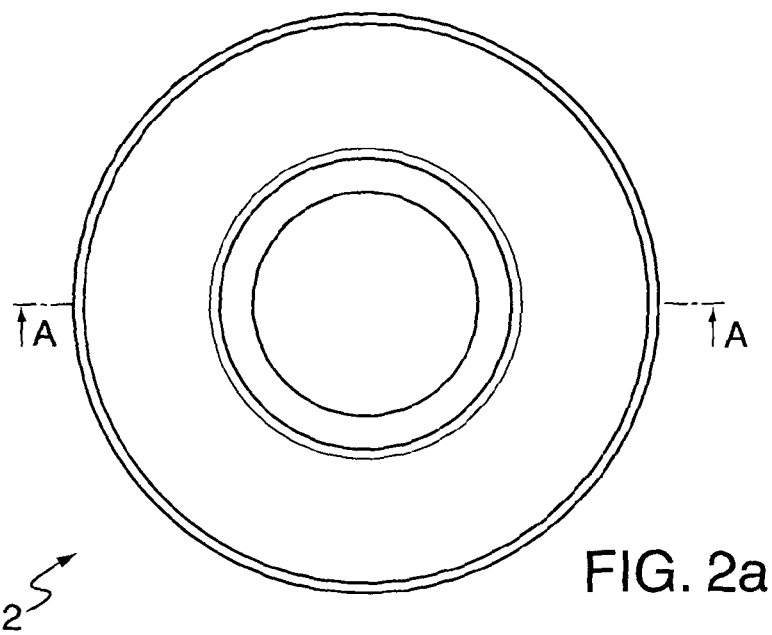
FIG. 2a is a plan view of an embodiment of a female component of a preferred embodiment of a connector.
Figure 2B:
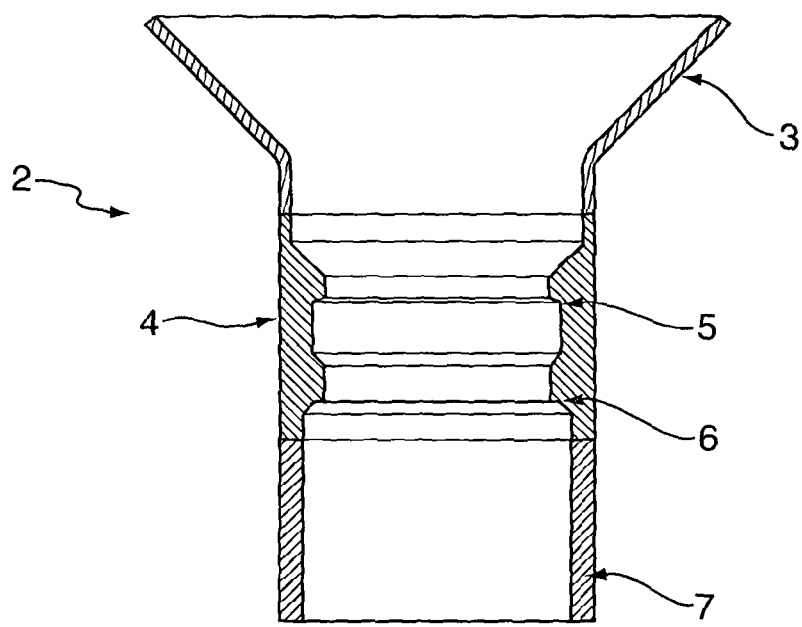
FIG. 2b is a front cross-section of a female component of a preferred embodiment of a connector.

As shown in FIG. 2a and FIG. 2b, the female component 2 comprises a guiding funnel 3, a load ring 4 with segment and latch load shoulders 5, 6 and a typical structural interface 7 to the connected equipment.

Figure 3A:
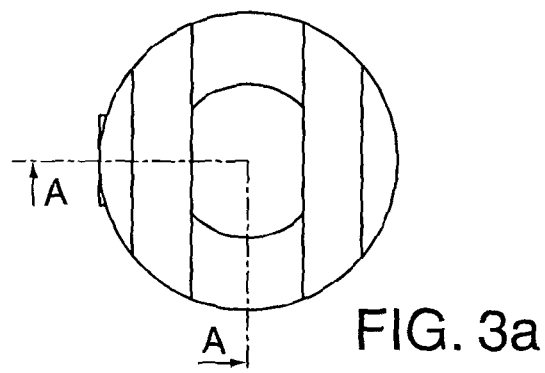
FIG. 3a is a top section of a male component of a preferred embodiment of a connector.
Figure 3B:
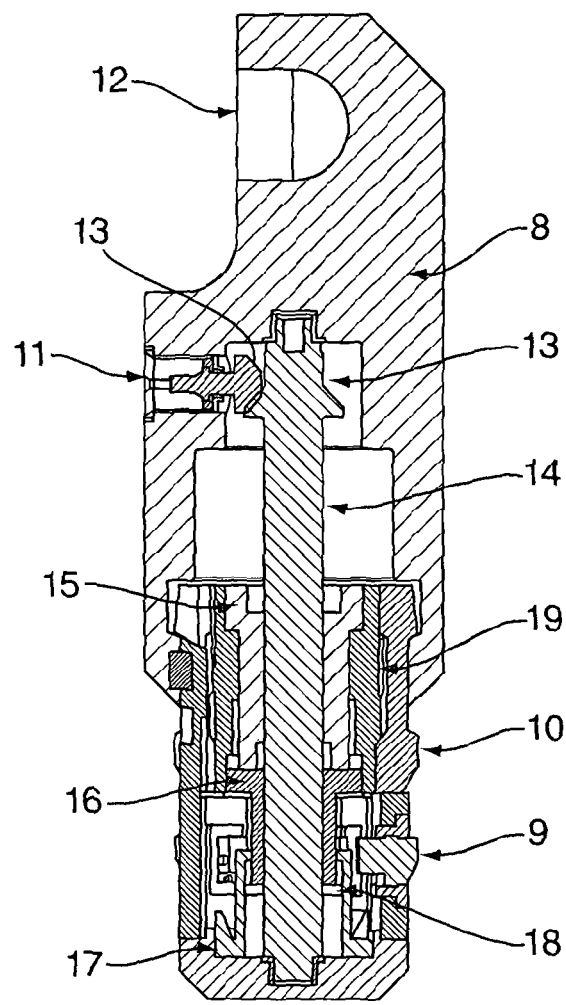
FIG. 3b is a two way cross-section as indicated in FIG. 3a of a male component of a preferred embodiment of a connector.

FIG. 3a shows a plan view of the male component whilst FIG. 3b shows a detailed view of the male component 1 in double section view. A typical actuation mechanism using a standard torque interface 11 and bevel gearbox 13 is shown. However, this may be modified to suit operational demands. The gearbox 13 drives a central shaft 14 which is used to move a cylinder 15 vertically up and down.

Figure 5:
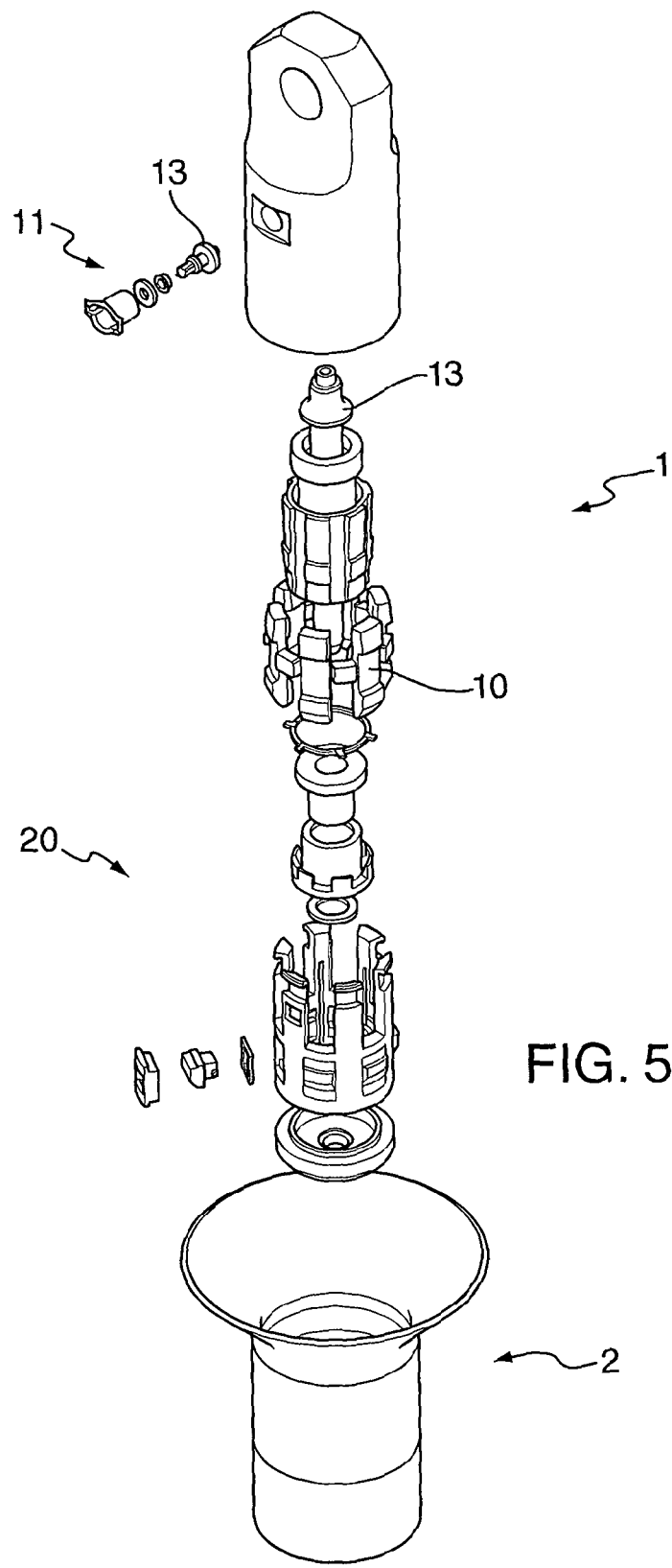
FIG. 5 is an exploded view of a preferred embodiment of a connector.

As shown in FIG. 3b and FIG. 5, a typical activation or actuation mechanism using a standard torque interface 11 (coupler) and bevel gearbox 13 is shown. In this arrangement, a gearbox drives a central shaft 14 which is used to move a drive cylinder 15 vertically up and down via a helical threadform. Depending on operational demands, this actuating mechanism may be modified, for example, a hydraulic cylinder may be incorporated within the connector 20, or a facility to hydraulically drive the cylinder 15 from the connector periphery.

The drive cylinder 15 is rigidly connected to a flanged sleeve 16 that slides over the central shaft. A flared sleeve 17 for actuating the latches (engagement members 9) is trapped to the first flanged sleeve 16 with a retainer plate 18. An externally tapered mandrel 19 is trapped between the drive cylinder 15 and the flanged sleeve 16.

The aforementioned components are axially arranged such that the drive cylinder 15 can be actuated in three distinct positions. These positions enable independent positioning of the flared sleeve 17 and tapered mandrel 19 and thus the preloaded segments (securement members) 10 and latch function/engagement members 9. The axial positioning during installation is preserved by helical springs installed in the annular spaces above and below the flanged sleeve 16.

Figure 4A:
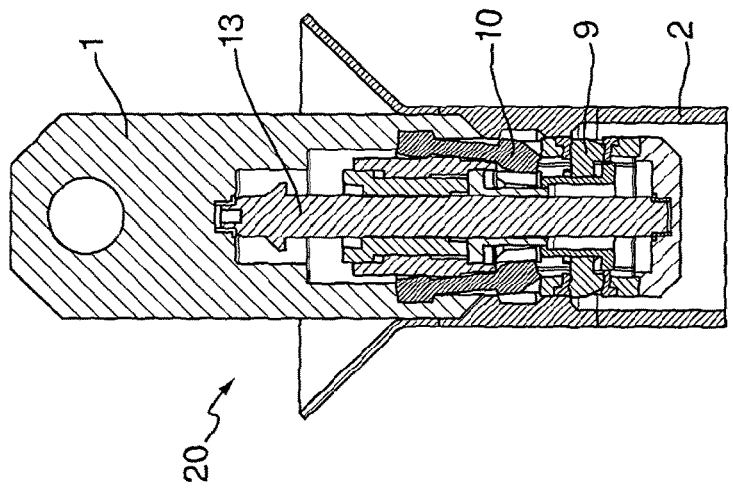
FIG. 4a is a front cross-section of a preferred embodiment of a connector with the male component in the initial engaged but unsecured/unloaded configuration.
Figure 4B:
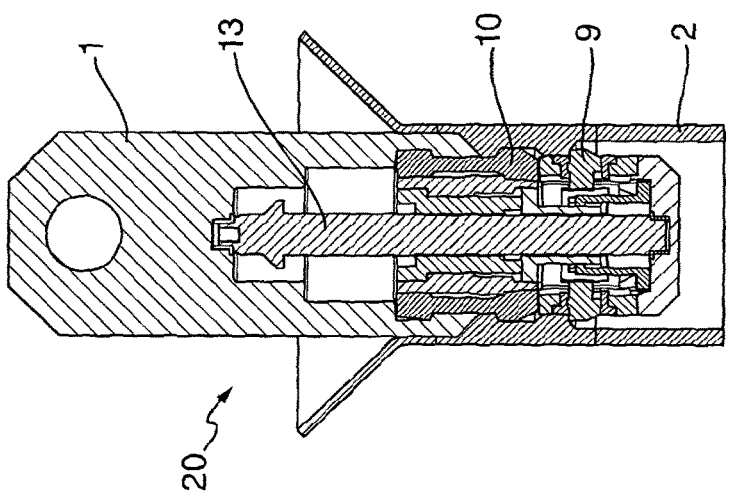
FIG. 4b is a front cross-section of a preferred embodiment of a connector with the male component in a fully engaged and secured/loaded configuration.
Figure 4C:
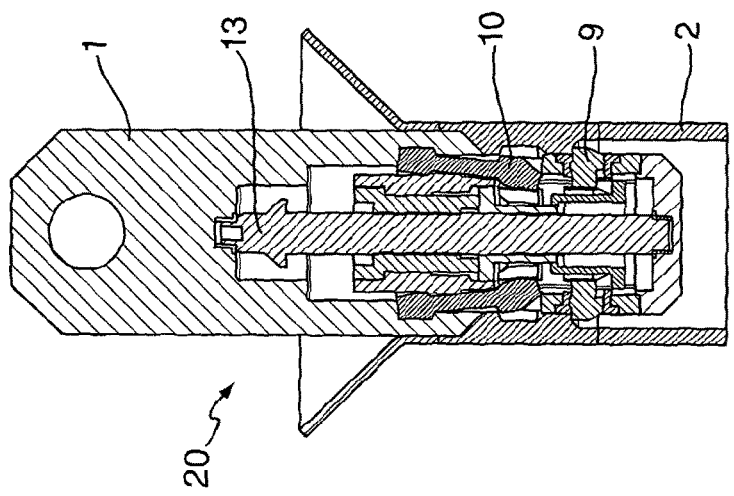
FIG. 4c is a front cross-section of a preferred embodiment of a connector with the male component in a disengaged and unsecured/unloaded configuration.

FIG. 4a, FIG. 4b and FIG. 4c demonstrate the three positions of the drive cylinder 15 as noted above, after the male component 1 has been inserted in the female component 2.

In FIG. 4a, the drive cylinder 15 is positioned such that the helical spring between the flanged sleeve 16 holds the mandrel 19 in the top position. The flared sleeve 17 is held in the bottom position by a second helical spring. In this manner, the latches 9 are free to move radially. They are held outward by spring force. A tapered leading edge on the latch 9 or lug enables it to retract as it is inserted in the female receptacle 2. Once inserted, the latch 9 is sprung outwards below the latch load shoulder 6 (engagement surface), holding the male component 1 within the female component 2.

As shown in FIG. 4b, once latched, the mechanism is actuated, driving the drive cylinder 15 downwards and forcing the segments radially outward by virtue of the mating taper of the mandrel 19. The taper on the mandrel is selected to give a mechanical advantage and reduce the axial load on the drive cylinder. When forced outward, mating tapers on the segment load shoulder 5 (securement surface) and within the forged body 8 generate a residual tensile stress within the segments 10 and compressive stress between the two aforementioned shoulders. By selecting the amount of residual stress, the performance of the connector can be tuned to achieve optimum fatigue life and bending capacity for the application.

In FIG. 4c, the drive cylinder 15 is forced upward, retracting the mandrel 19 and flanged sleeve 16. When retracted, the mandrel tilts the segment 10 about the forged body load shoulder 8, retracting it inward. Similarly, the flanged sleeve 16 retracts the latches radially. In the arrangement shown, the flanged sleeve 16 retracts the latches 9 via an inclined plane which interferes with a pin on the innermost edge of the latch 9. In this position, the male component 1 can be withdrawn from the female component 2.

In the preferred described connector, the activation means comprises an ROV torque actuator. However, in alternative embodiments, the activation means may comprise direct or attached pistons to move the drive cylinder.

Another preferred embodiment of the connector 20 is shown in FIG. 6 to FIG. 12. In this arrangement, the radially projecting segments 29 perform the automatic latching feature, with the addition of spring that forces the segments 29 radially outward. In this manner, the radially projecting spring loaded catches 9 of the previous embodiment, as described in FIG. 1 to FIG. 5, and associated actuating mechanism are omitted. Specifically, in this further embodiment of the present invention, the male component 1 includes a single series or array of segments (connector members) 29 which function as both the engagement means and the subsequent securement means for the connector 1.

In particular, this embodiment comprises a series of lugs 29 which are radially spaced around the circumference of the male component 1. These lugs 29 provide a dual function and specifically act as both engagement lugs and also securement lugs. These lugs include a sloped/angled surface to enable the lugs to be deflected radially inwardly as the male component 1 is inserted into the female component 2. In particular, the lugs 29 have a downwardly facing angled/sloped surface which will abut and be deflected inwardly by the guiding surface 60 provided at the mouth portion of the female component 2.

The lugs 29 provide both an engagement surface and a securement surface.

The connector members 29 are spring loaded such that the connector members deflect inwardly on insertion into the female receptacle and then deflect outwardly once the engagement surface of the lugs 29 locates below the engagement surface provided by the shoulder 25 of the female receptacle. The engagement surface of the lugs then interacts with the shoulder 25 to prevent removal or disengagement of the male component from the female receptacle 2. The male component 1 can then be secured to the female component upon further activation of connector members 29.

The connector members 29 are positively forced radially outwardly such that a securement surface of the lugs 29 interacts and is urged against the securement surface provided by the load shoulder 25. This urges the male component 1 further into the female receptacle and a securement surface 62 on the male component 1 will be urged against a corresponding and directly facing annular securement surface 64 on the female component 2. This trapping or squeezing effectively compresses a ring portion of the female component 2 and provides a preloaded connection.

As shown in FIG. 6a, the connector 20 comprises an actuated male component 1, which is inserted into a static female receptacle 2. The male component 1 contains a number of radially projecting spring loaded segments 29 to provide an automatic latching mechanism, an actuator cylinder 39 (see FIG. 9b) to move them to the released, latching or engaged positions, and a torque or pressure responsive method for moving the actuator cylinder 39.

The connector 20 comprises an actuated male component 1, which is inserted into a static female receptacle 2. The receptacle comprises 2 a substantially cylindrical opening with an internal diameter which is dimensioned to the external diameter of the male component 1 so that when the male component 1 is inserted, the two components 1, 2 are sufficiently aligned to enable a static profile on the external diameter of the male component 1 to land on a matching profile on the internal diameter of the female component (receptacle) 2.

The male component 1 includes engagement/securement (connector) members 29 in the form of radially projecting spring loaded segments 29 which are positioned axially on the male component 1. When the male component 1 lands on a shoulder within the female receptacle 2, the catches 29 are permitted to extend within corresponding securement areas which comprise a machined profile in the receptacle 2. In particular, the female component 2 includes a circumferential shoulder or surface which is arranged to cooperate with the ends and particularly a face of the catches 29.

The axial position of the catches 29 and the profile, relative to the aforementioned shoulder, prevents relative axial movement of the male and female components 1, 2 to the tolerance of the mechanism.

The downward facing edges (surfaces) of the catches 29 are tapered and the radial spring force is selected such that the inertia of the male or female component 1, 2 is sufficient to retract the catches 29 past the aforementioned shoulder profile within the receptacle 2. As described, this mechanism provides an automatic latching capability or an initial engagement capability.

Once latched, an actuator or activator 31 is remotely operated on the body of the male component 1. This forces an actuator member in the form of a segment actuator cylinder 39 to move in one direction. The movement of the segment actuator cylinder 39 moves each of the segments 29 outwards into a securing recess such that securement surfaces on the segments 29 or on a lug of the male component 1 abut and secure against a second securement surface within the securing recess of the female receptacle 2, thereby securing the male and female components 1, 2 together. The securement surfaces of the segments 29 and male and female components 1, 2 are tapered, such that by forcing the segments 29 outwards, a tensile force is induced in the segments 29 and a balancing compressive force exists between the male component 1 and female receptacle shoulders. The tensile force, or preload, enables the relatively slender segments 29 to achieve an enhanced fatigue life, compared to an unloaded component of the same size.

FIG. 6a shows an isometric view of the male component 1 whilst unsecured and disengaged from the female component 2. The male component 1 comprises a forged cylindrical body which retains the latching device, the preloaded segments, the actuating mechanism (not shown), a remote actuation interface and a typical interface to mooring equipment. FIG. 6b shows the male component 1 in a secured and engaged configuration within the female component 2.

Figure 7A:
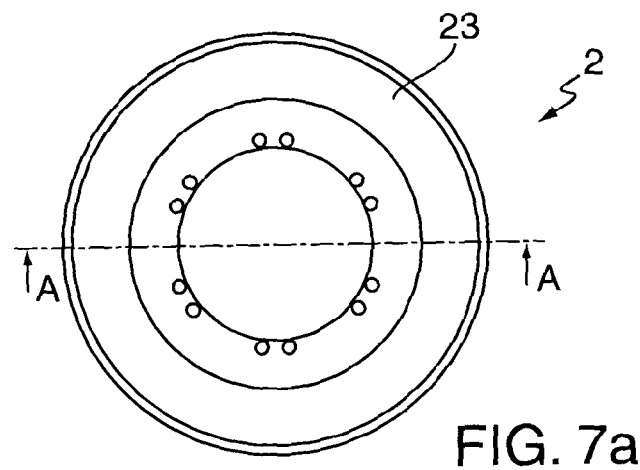
FIG. 7a is a plan view of an embodiment of a female component of another preferred embodiment of a connector.
Figure 7B:
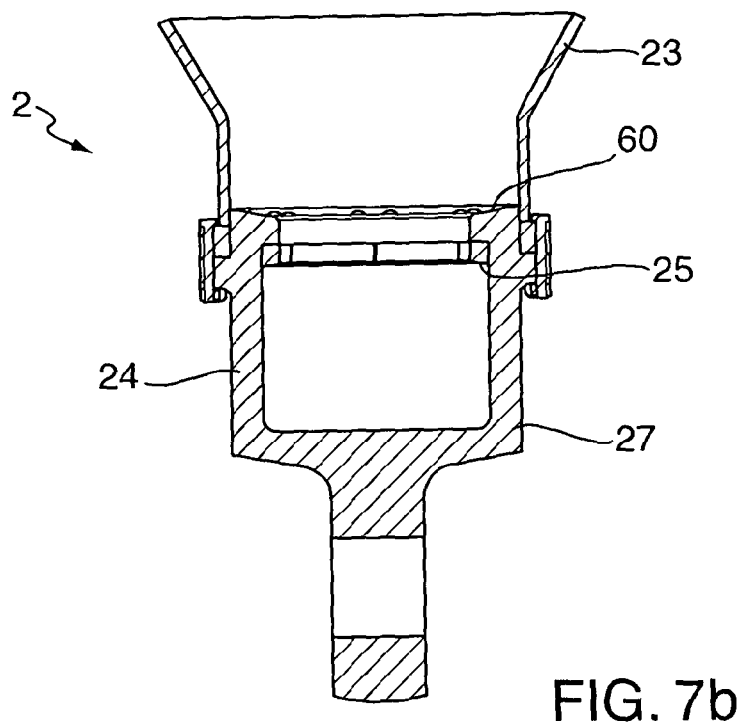
FIG. 7b is a front cross-section of a female component of another preferred embodiment of a connector.

As shown in FIG. 7a and FIG. 7b, the female component 22 comprises a guiding funnel 23, a load ring 24 with segment load shoulders 25 and a typical structural interface 27 to the connected equipment.

Figure 8:
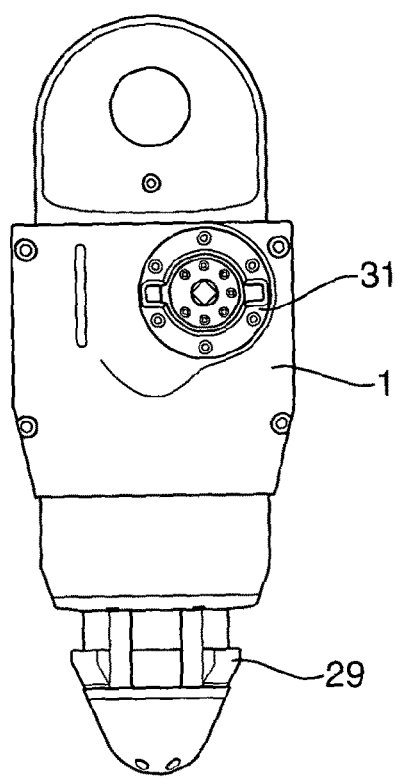
FIG. 8 is a side view of a male component of another preferred embodiment of a connector.

FIG. 8 shows a side view of the male component 1 from the front face.

Figure 9A:
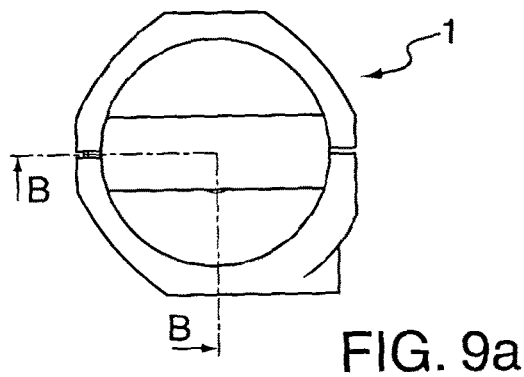
FIG. 9a is a plan view of a male component of another preferred embodiment of a connector.
Figure 9B:
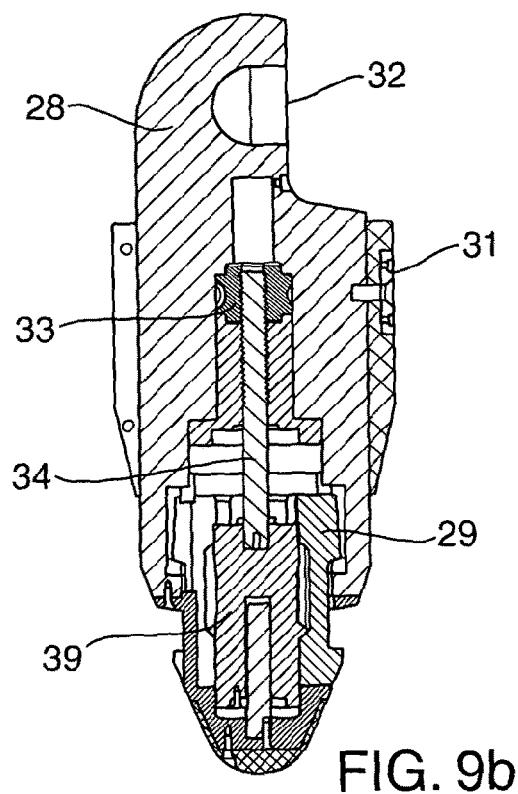
FIG. 9b is a two way cross-section as indicated in FIG. 9a of a male component of another preferred embodiment of a connector.

FIG. 9a shows a plan view of the male component 1 and FIG. 9b shows a detailed view of the male component 1 in double section view. A typical actuation mechanism using a standard torque interface and worm gearbox 33 is shown. However, this may be modified to suit operational demands. The gearbox 33 drives a central shaft 34 up and down, which is attached to the actuator cylinder 39.

As shown in FIG. 9b, a typical activation or actuation mechanism using a standard torque interface 31 (coupler)

and worm gearbox 33 is shown. In this arrangement, a gearbox 33 drives a central shaft 34 up and down via a helical threadform. The central shaft 34 is directly coupled to the actuator cylinder 39. Depending on operational demands, this actuating mechanism may be modified, for example, a hydraulic cylinder may be incorporated within the connector 20, or a facility to hydraulically drive the cylinder 39 from the connector periphery.

The actuator cylinder 39 features an external taper and profiles that interface with profiles machined on the radially inward faces of the segments 29.

The actuator cylinder 39 can be actuated in three distinct positions and thus the position or freedom of movement of the preloaded segments (connector members) 29.

Figure 10A:
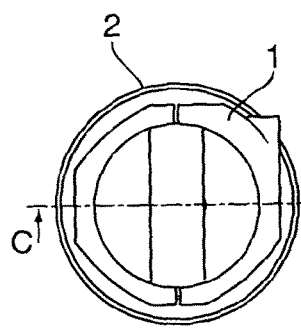
FIG. 10a is a plan view of another preferred embodiment of a connector with the male component in the initial engaged but unsecured/unloaded configuration.
Figure 11A:
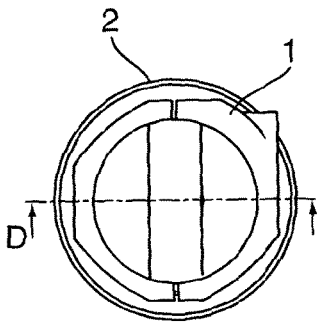
FIG. 11a is a plan view of another preferred embodiment of a connector with the male component in a fully engaged and secured/loaded configuration.
Figure 12A:
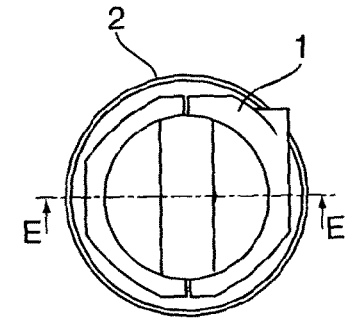
FIG. 12a is a plan view of another preferred embodiment of a connector with the male component in a disengaged and unsecured/unloaded configuration.

FIG. 10 to FIG. 12 demonstrate the three positions of the actuator cylinder 39 as noted above, after the male component 1 has been inserted in the female component 2.

Figure 10B:
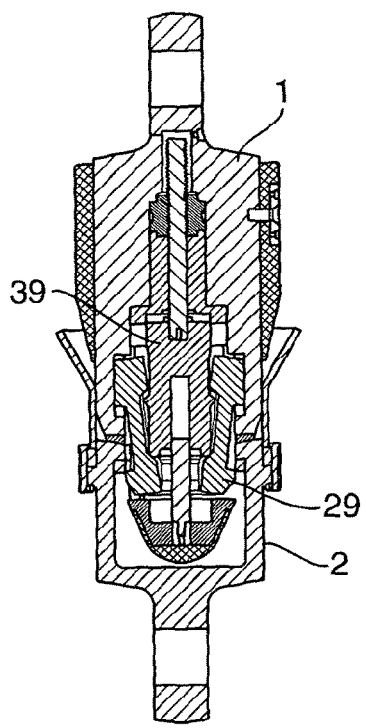
FIG. 10b is a front cross-section as indicated in FIG. 10a of another preferred embodiment of a connector with the male component in the initial engaged but unsecured/unloaded configuration.

In FIG. 10b, the actuator cylinder 39 is positioned such that the segments 29 are free to move radially. The segments 29 are shown in the radially inward position but normally are held outward by spring force. The segments 29 have tapered leading edges which enable the segments 29 to retract as the segments 29 are inserted in the female receptacle 2. Once inserted, the segments 29 are sprung outwards below the load shoulder 25 (engagement surface), which thereby holds the male component 1 within the female component 2.

Figure 11B:
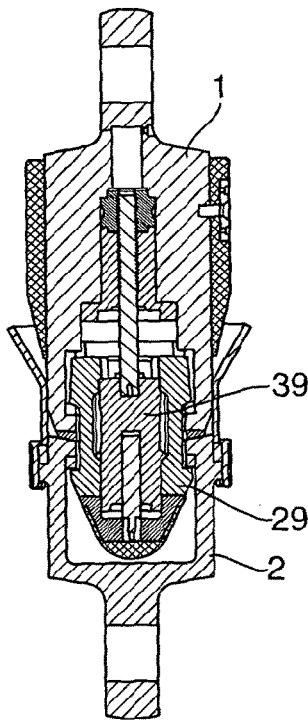
FIG. 11b is a front cross-section as indicated in FIG. 11a of another preferred embodiment of a connector with the male component in a fully engaged and secured/loaded configuration.

As shown in FIG. 11b, once latched, the mechanism is actuated, driving the actuator cylinder 39 downwards and forcing the segments 29 radially outward by virtue of the mating taper of the cylinder 39. The taper on the cylinder 39 is selected to give a mechanical advantage and reduce the axial load on the central shaft 34. When forced outward, mating tapers on the load shoulder 25 (securement surface) and within the forged body 28 generate a residual tensile stress within the segments 29 and compressive stress between the two aforementioned shoulders. By selecting the amount of residual stress, the performance of the connector 20 can be tuned to achieve optimum fatigue life and bending capacity for the application.

Figure 12B:
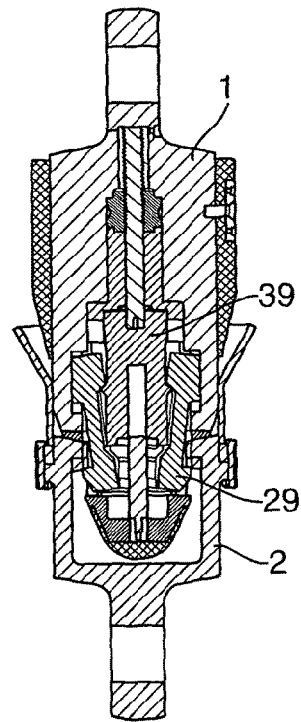
FIG. 12b is a front cross-section as indicated in FIG. 12a of another preferred embodiment of a connector with the male component in a disengaged and unsecured/unloaded configuration.

In FIG. 12b, the actuator cylinder 39 is forced to its uppermost position. When in this position, the actuator cylinder 39 tilts the segments 29 about the forged body 28 load shoulder, retracting the segments 29 inward. In this position, the male component 1 can be withdrawn from the female component 2.

In the preferred described connector 20, the activation means comprises an ROV torque actuator. However, in alternative embodiments, the activation means may comprise direct or attached pistons to move the central shaft.

The invention claimed is:

1. A subsea preloaded connector comprising a male component and a female component, the subsea preloaded connector comprising connector members on the male component, wherein the connector members each comprise a lower end arranged to move radially into an engagement with an engagement surface on the female component to initially engage the male component to the female component and whereby the engagement is an automatic latching mechanism, and wherein the subsea preloaded connector comprises actuating means to actuate the lower ends once the male component and the female component are engaged, wherein the actuating means comprise an actuator cylinder configured to actuate the lower ends irrespective of tension placed on a guideline, and wherein the lower ends are configured to move radially into securement with a securement surface on the female component and wherein the lower ends and the securement surface comprise cooperating securement surfaces which create a residual stress between the male and female components which causes the subsea preloaded connector to be preloaded on securement of the male and female components, the radial movement of the lower ends creates a tensile force within the connector members and a balancing compressive force between the male component and the female component and wherein the radial movement of the lower ends compresses a ring portion of the female component to provide a preloaded connection.

2. A subsea preloaded connector according to claim 1 in which the connector members comprise a plurality of engagement members and wherein the engagement members are arranged to deflect inwardly as the male component is inserted into the female component.

3. A subsea preloaded connector according to claim 2 in which the engagement members comprise radially projecting spring loaded engagement members which are held outward by a spring force and wherein the engagement members are retracted as the male component is inserted into the female component and, once inserted, the engagement members are arranged to spring outwardly to hold the male component within the female component.

4. A subsea preloaded connector according to claim 1 in which the connector members comprise a plurality of engagement members and a plurality of securement members and the actuator cylinder comprises a drive cylinder which is actuated between three distinct positions, in which:
in the first position the engagement members are free to move radially;
in the second position the securement members are forced radially outwardly;
in the third position the engagement members and the securement members are retracted radially inwardly.

5. A subsea preloaded connector according to claim 4 wherein:
in the first position the connector members are free to move radially and are held outwardly by spring force which thereby holds the male component within the female component;
in the second position the drive cylinder forces the connector members radially outwardly to generate a residual stress within the connector members and a compressive stress between a securement surface on the male component and a securement surface on the female component; and
in the third position the connector members are retracted inwardly to enable the male component to be withdrawn from the female component.

6. A subsea preloaded connector according to claim 5 in which each connector member is operable between a secured configuration and an unsecured configuration, wherein, in the secured configuration, each connector member is fixed in a static configuration and in an outer position and, in the unsecured configuration, each connector member is movable towards an inner position.

7. A subsea preloaded connector according to claim 5 in which the first end of each connector member comprises a lug which operates as both an engagement lug and a securement lug to engage and secure within a securement recess, in which the lug includes a shaped surface to cooperate with a shaped surface of the securement recess and in which the shaped surface of the lug comprises a tapered or sloped surface to cooperate with a tapered or sloped surface provided by the securement recess and in which the cooperating surface are arranged to cause the male component to move axially relatively towards the female component in order to preload the subsea preloaded connector.

8. A subsea preloaded connector according to claim 1 in which the connector members each comprise a plurality of securement members and a securement actuator in order to secure each securement member against the securement surface, in which the securement actuator is controlled by activation means and, in which, the securement actuator is movable within the male component between a first position and a second position and the securement actuator is axially movable within the male component and moves co-axially along a central longitudinal axis of the male component.

9. A subsea preloaded connector according to claim 8 in which the activation means comprise a coupler in order for the activation means to be activated by a separate control means and wherein the control means comprises a Remote Operated Vehicle (ROV).

10. A subsea preloaded connector according to claim 4 in which the or each engagement member is located towards a distal end of the male component relative to the or each securement member which is located towards a proximal end of the male component.

11. A subsea preloaded connector according to claim 1 in which the female component comprises guide means to guide the male component into engagement with the female component and in which the guide means comprises an outwardly flared entry section.

12. A subsea assembly comprising a first subsea element, a second subsea element and a preloaded connector comprising a male component and a female component, the preloaded connector comprising connector members on the male component, wherein the connector members each comprise a lower end arranged to move radially into an engagement with an engagement surface on the female component to initially engage the male component to the female component and whereby the engagement is an automatic latching mechanism, and wherein the preloaded connector comprises actuating means to actuate the lower ends once the male component and the female component are engaged, wherein the actuating means comprise an actuator cylinder configured to actuate the lower ends irrespective of tension placed on a guideline, and wherein the lower ends configured to move radially into securement with a securement surface on the female component and wherein the lower ends and the securement surface comprise cooperating securement surfaces which cause the preloaded connector to be preloaded on securement of the male and female components, the radial movement of the lower ends creates a tensile force within the connector members and a balancing compressive force between the male component and the female component and wherein the radial movement of the lower ends compresses a ring portion of the female component to provide a preloaded connection.

13. A method of connecting a first subsea element to a second subsea element comprising inserting at least a part of a male component into a female component and urging connector members on the male component radially in order for the connector members to engage with an engagement surface on the female component to engage the male component to the female component, wherein the connector members each have a lower end and the method comprises:
    automatically latching the male component to the female component by this engagement, subsequently radially moving the lower ends of the connector members into securement with a securement surface on the female component, wherein the male component further comprises a securement actuator to secure the lower ends of the connector members against the securement surface, wherein the securement actuator is axially moveable within the male component irrespective of any tension placed on a guideline;
    creating a tensile force within the connector members and a balancing compressive force between the male component and the female component; and
    compressing a ring portion of the female component to provide a preloaded connection
    and wherein the lower ends of the connector members and the securement surface comprise cooperating securement surfaces which cause the subsea preloaded connector to be preloaded on securement of the male and female components.

14. A subsea preloaded connector according to claim 1 wherein the securement actuator is controlled by activation means comprising a threaded shaft located within the male component, wherein the threaded shaft engages with the securement actuator such that rotation of the threaded shaft causes translational movement of the securement actuator.

* * * * *